(12) United States Patent
Hong et al.

(10) Patent No.: US 8,073,232 B2
(45) Date of Patent: Dec. 6, 2011

(54) METHOD AND SYSTEM FOR DIAPHRAGM SEGMENTATION IN CHEST X-RAY RADIOGRAPHS

(75) Inventors: Lin Hong, Monmouth Junction, NJ (US); Ying Li, Sherman Oaks, CA (US); Hong Shen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 748 days.

(21) Appl. No.: 12/284,136

(22) Filed: Sep. 18, 2008

(65) Prior Publication Data

US 2009/0087072 A1   Apr. 2, 2009

Related U.S. Application Data

(60) Provisional application No. 60/976,813, filed on Oct. 2, 2007.

(51) Int. Cl.
   *G06K 9/00*   (2006.01)

(52) U.S. Cl. .................................................. 382/132
(58) Field of Classification Search .......... 382/128–132, 382/199, 266
   See application file for complete search history.

(56) References Cited

U.S. PATENT DOCUMENTS

| | | | |
|---|---|---|---|
| 6,282,307 B1 | 8/2001 | Armato, III et al. | 382/132 |
| 6,483,934 B2 | 11/2002 | Armato, III et al. | 382/132 |
| 6,724,925 B2 | 4/2004 | Armato, III et al. | 382/131 |
| 2002/0009215 A1 | 1/2002 | Armato, III et al. | 382/132 |
| 2008/0181481 A1 | 7/2008 | Hong et al. | 382/132 |

*Primary Examiner* — Courtney Thomas

(57) ABSTRACT

A method and system for segmenting diaphragm regions in a chest X-ray radiograph is disclosed. The diaphragm regions are segmented based on left and right lung lobe regions and a heart region in the chest X-ray radiograph. A right diaphragm region is segmented in the chest X-ray radiograph based a boundary of the right lung lobe. A left diaphragm region is segmented in the chest X-ray radiograph based on the heart region and a boundary of the left lung lobe.

26 Claims, 6 Drawing Sheets

METHOD AND SYSTEM FOR DIAPHRAGM SEGMENTATION IN CHEST X-RAY RADIOGRAPHS

This application claims the benefit of U.S. Provisional Application No. 60/976,813, filed Oct. 2, 2007, the disclosure of which is herein incorporated by reference.

BACKGROUND OF THE INVENTION

The present invention relates to diaphragm segmentation in a chest X-ray radiograph, and more particularly, to estimating regions representing the diaphragm in a chest X-ray radiograph, for nodule detection in the diaphragm region.

Nodules are small masses of tissue, which can form on various organs in the human body, such as the lungs. Lung nodule detection can be used for advance cancer screening. Accordingly, computer implemented methods for automatic nodule detection methods have been developed to detect nodules in chest X-ray radiographs. Such automatic nodule detection methods determine locations in a chest X-ray radiograph at which there is a high probability that a nodule exists.

In chest X-ray radiographs, diaphragm regions typically exhibit unique intensity characteristics. Diaphragm regions can represent special regions of interest for nodule detection in chest X-ray radiographs. For example, in lung nodule detection, detectable nodules in diaphragm regions are typically much larger and less prominent in intensity distribution, thereby exhibiting very different image characteristics from nodules in the upper lung lobes. Accordingly, special handling may be required to ensure reliable detection of nodules in diaphragm. In order to initiate special handling of the nodules in diaphragm regions, a valid segmentation of the diaphragm is need. However, even though many techniques have been developed for segmentation of lung lobes, heart regions, and ribs in chest x-ray radiographs, diaphragm segmentation has not been well addressed. Furthermore, diaphragm regions typically do not have a clear-cut definition in chest x-ray images, and there is not much edge information and/or intensity information that provides sufficient support segmenting diaphragm regions using a general segmentation algorithm. Therefore, a method of diaphragm segmentation in chest X-ray radiographs is desirable.

BRIEF SUMMARY OF THE INVENTION

The present invention provides a method for segmenting diaphragm regions in chest X-ray radiographs. Embodiments of the present invention utilize a rule-based method for segmenting diaphragm regions based on the location of lung lobes and a heart region in a chest X-ray radiograph. The segmented diaphragm can be used in nodule detection applications, for example to separately detect nodules in the segmented diaphragm regions.

In one embodiment of the present invention, diaphragm regions are segmented in a chest X-ray radiograph based on left and right lung lobe regions and a heart region in the chest X-ray radiograph. A right diaphragm region is segmented in the chest X-ray radiograph based a boundary of the right lung lobe. A left diaphragm region is segmented in the chest X-ray radiograph based on the heart region and a boundary of the left lung lobe.

These and other advantages of the invention will be apparent to those of ordinary skill in the art by reference to the following detailed description and the accompanying drawings.

DETAILED DESCRIPTION

The present invention is directed to a method for segmenting diaphragm regions in an X-ray radiograph. Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to segmenting diaphragm regions in a chest X-ray radiograph. The segmentation of the diaphragm regions, according to embodiments of the present invention, is based in part on boundaries of the lungs acquired using a lung segmentation method and a boundary of the heart acquired using a heart segmentation method. Various methods for segmenting lungs and the heart in an X-ray radiograph are well known. Accordingly, the embodiments of the present invention described below assume that lung lobe regions and a heart region in an input image (chest x-ray radiograph) are already segmented. The diaphragm regions in the image are then segmented based in part on the boundaries of the lung lobe regions and the heart region, and lung nodules in the diaphragm regions can be detected separately from nodules in the upper lung lobe regions.

Automatic segmentation of diaphragm regions in chest X-ray images (radiographs) may be difficult, since diaphragm regions typically do not have a clear-cut definition in chest X-ray images. In particular, lower diaphragm boundaries are not clearly defined in chest X-ray images. Traditional segmentation techniques, such as graph cut, level set, and active shape model, are not effective for diaphragm segmentation. Embodiments of the present invention segment diaphragm regions in a chest X-ray radiograph by generating an approximation of diaphragm regions using a rule-based method that imposes a number of heuristics to compensate for the scope of ill-defined target regions in the image. In order to approximate the diaphragm regions, the boundaries of left and right lung lobes are used to generate initial upper boundaries, and then a number of rule-based heuristics are applied to generate refinements and lower boundaries.

Figure 1:
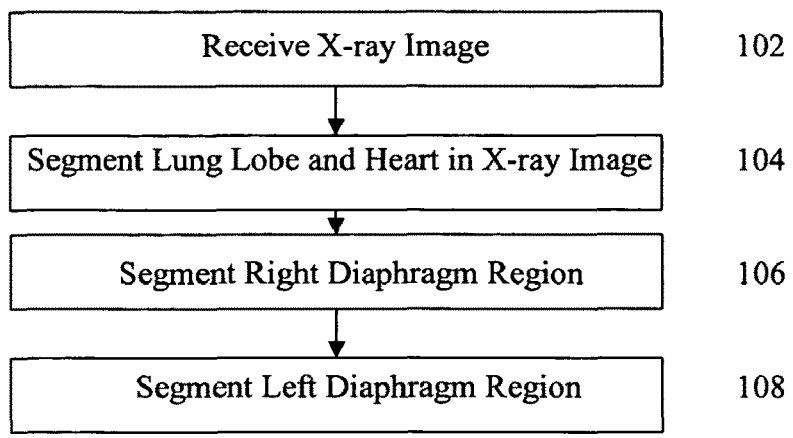
FIG. 1 illustrates a basic structure of a diaphragm segmentation method according to an embodiment of the present invention.

FIG. 1 illustrates a basic structure of a diaphragm segmentation method according to an embodiment of the present invention. As illustrated in FIG. 1, at step 102 a chest X-ray image is received. The image can be received directly from an image acquisition device, such as an X-ray imaging device. Alternatively, the image can be received by loading an image, stored on a computer readable medium, or memory or storage of a computer system. At step 104, left and right lung lobe regions and a heart region are segmented in the chest X-ray image. The lung lobes and heart can be segmented using any segmentation technique, resulting in contours that define boundaries for the left and right lung lobe regions and the heart region. For example, a heart region segmentation method is described in U.S. Publication No. 2008/0181481, filed Jul. 31, 3008, which is incorporated herein by reference. At step, 106 a right diaphragm region is segmented in the chest X-ray image based on the right lung lobe region. At step 108, a left diaphragm region is segmented based on the left lung lobe region and the heart region. Accordingly, right and left diaphragm regions are segmented separately. The segmentation of the right and left diaphragm regions is described in greater detail below.

Figure 2:
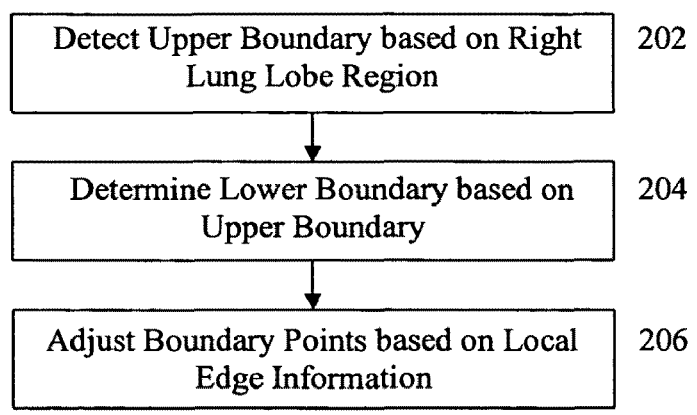
FIG. 2 illustrates a method for segmenting a right diaphragm region in a chest X-ray image according to an embodiment of the present invention.

FIG. 2 illustrates a method for segmenting a right diaphragm region in a chest X-ray image according to an embodiment of the present invention. The method of FIG. 2 can be used to perform step 106 of the method of FIG. 1. Referring to FIG. 2, at step 202, an upper boundary of the right diaphragm region is detected based on the right lung lobe region. The upper boundary of the right diaphragm region is coincident with the lower boundary of the right lung lobe. At step 204, the lower boundary of the right diaphragm region is determined based on the upper boundary of the right diaphragm region. It may be difficult to extract the lower boundary of the right diaphragm region directly from the input chest X-ray image, since there may be not enough edge information available to provide sufficient evidence to reliably locate the lower boundary. Therefore, the lower boundary of the right diaphragm region is heuristically defined as the symmetric reflection of the upper boundary of the right diaphragm region along the axis passing through the two endpoints of the upper boundary of the right diaphragm region. The upper and lower boundaries define a boundary of the right diaphragm region in the chest X-ray image. At step 206, points on the lower boundary of the right diaphragm region are adjusted based on local edge information. Step 206 is an optional step that provides small adjustments to the right diaphragm region boundary based on local edge information in order take into account any edge information that is available in the chest X-ray image. For example, the position of a given lower boundary point can be adjusted up 2-3 pixels up or down based on the local edge peak information.

Figure 3:
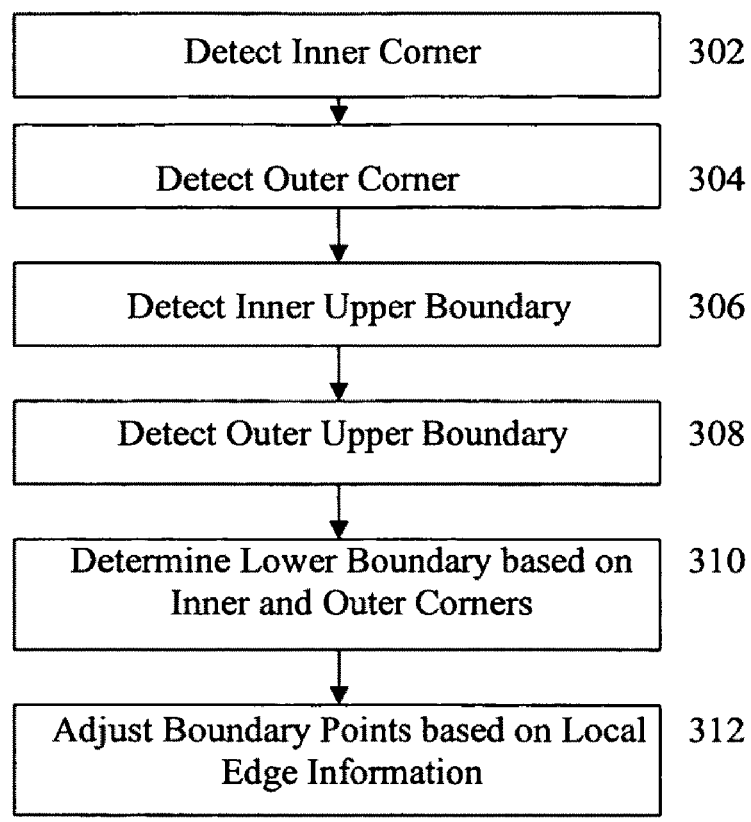
FIG. 3 illustrates a method for segmenting a left diaphragm region in a chest X-ray image according to an embodiment of the present invention.

Detection of the left diaphragm region is more difficult that detection of the right diaphragm region due to the presence of the heart region, which causes left diaphragm regions to exhibit significantly different bottom boundary formations. FIG. 3 illustrates a method for segmenting a left diaphragm region in a chest X-ray image according to an embodiment of the present invention. The method of FIG. 3 can be used to perform step 108 of the method of FIG. 1. It is more complicated to locate the upper boundary of the left diaphragm region than to locate the upper boundary of the right diaphragm region. Accordingly, the method of FIG. 3 locates the upper boundary of the left diaphragm region by detecting inner and outer corners and portions of the upper boundary extending from the inner and outer corners.

Referring to FIG. 3, at step 302, an inner corner of the left diaphragm region is detected. The inner corner of the left diaphragm region is located at the intersection of the inner vertical boundary of the left diaphragm region and the lower boundary of the heart region. The inner boundary of the left diaphragm region is typically located within the heart region of the chest X-ray image. Accordingly, the segmented heart region provides a region of interest (ROI) in which the inner corner of the left diaphragm region can be detected. The inner corner can be detected by detecting an inner vertical boundary within the heart region, and detecting an intersection between the inner vertical boundary and the bottom boundary of the heart region.

Figure 4:
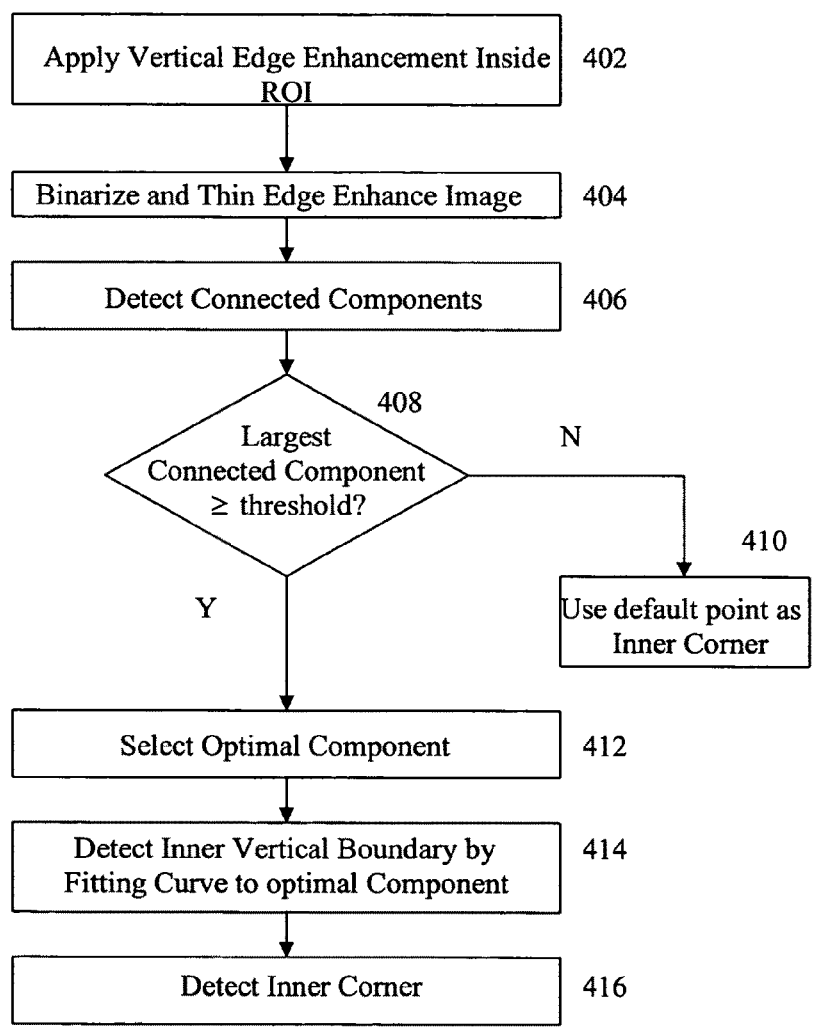
FIG. 4 illustrates a method for detecting the inner corner of the left diaphragm region in a chest X-ray image according to an embodiment of the present invention.

FIG. 4 illustrates a method for detecting the inner corner of the left diaphragm region in a chest X-ray image according to an embodiment of the present invention. As illustrated in FIG. 4, at step 402, vertical edge enhancement is applied inside to the ROI (i.e., inside the heart region). Since the heart boundary may not always be well segmented, morphological operations are applied on the ROI in order to exclude some boundary effects. A vertical edge enhancement operation is applied to the input image inside the ROI to obtain an edge enhanced image. This facilitates segmentation of the inner vertical boundary. At step 404, the edge enhanced image is binarized and thinned. The edge enhanced image is binarized and thinned to produce a binary image with all objects having a single pixel width. At step 406, connected components are detected in the thinned binary image. Starting from a reference point, e.g., the $13^{th}$ point (the leftmost corner point) of the bottom heart boundary, the method searches for the three longest connected components in a vertical direction in the thinned binary image. At step 408, it is determined whether the longest connected component is longer than a threshold value. For example, the threshold value may be 40 pixels. At step, 410 if the longest connected component is less than the threshold value, a default inner corner point is used as the inner corner of the left diaphragm region. If the longest connected component is less than the threshold value, this indicates that the inner vertical boundary of is obscured by the heart region and is too week to be detected. In this situation the default point can use the $13^{th}$ point of the heart contour as the x-coordinate of the inner corner and the bottom of the heart as the y-coordinate. At step 412, if the longest component is greater than or equal to the threshold value, a connected component closest to the reference point (e.g., $13^{th}$ point of the heart contour) is selected as the optimal component. The calculation of closeness to the reference point weighs the flowing factors: the average distance of the connected component to the reference point, the size of the component, and the orientation of the line (a vertical line is preferred). At step 414, the inner vertical boundary is detected by fitting the selected optimal component is fitted with a curve. A curve fitting procedure is used to fit the optimal component with a curve with an order up to two in order to ensure robustness. At step 416, the inner corner is detected as the intersection of the detected inner vertical boundary and the bottom boundary of the heart region.

Returning to FIG. 3, at step 304, the outer corner of the left diaphragm region is detected. The outer corner detection is similar to the inner corner detection illustrated in FIG. 4, except that the default point is different and an outer vertical boundary of the left diaphragm region is detected in order to detect the outer corner. If connected components representing the outer vertical boundary cannot be detected, a lowest point (i.e., having a smallest y-coordinate) on the left lung lobe outer boundary is used as the default point for the outer corner of the left diaphragm region. The region of interest for outer corner detection is a region defined as the portion of the left lung lobe region below the top of heart boundary.

Figure 5:
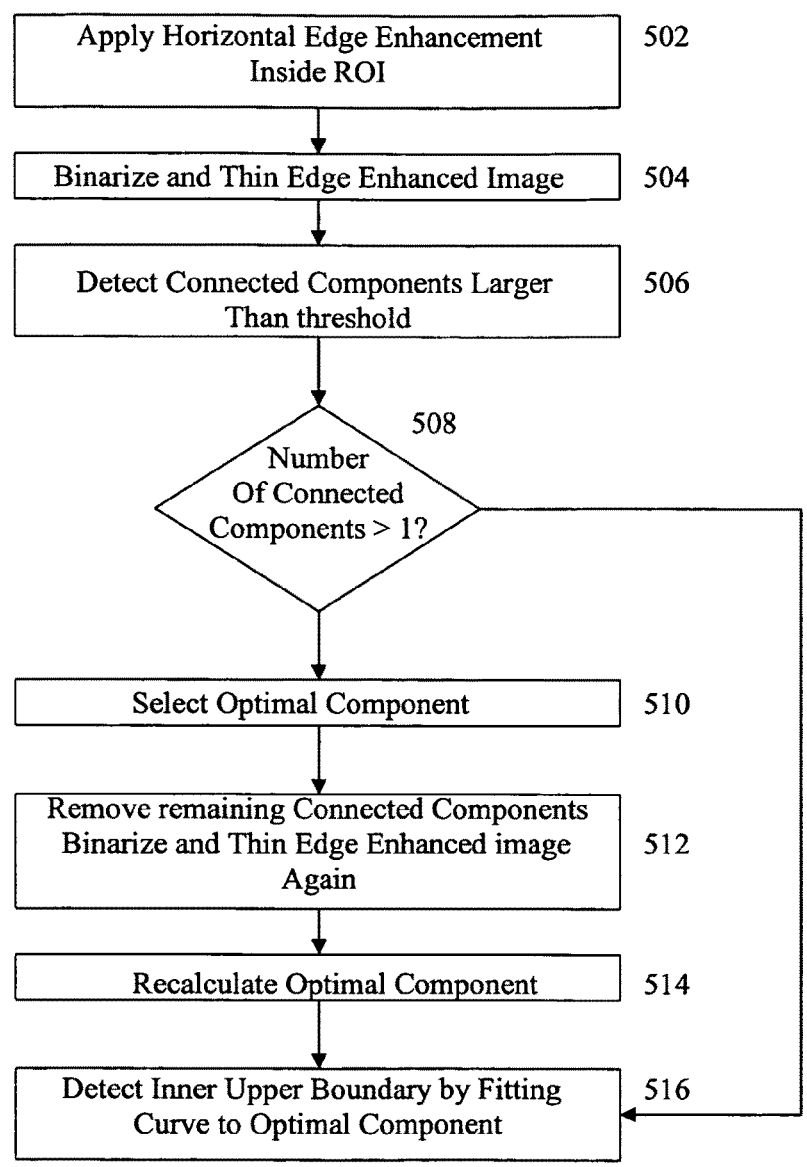
FIG. 5 illustrates a method for detecting the inner upper boundary of the left diaphragm region according to an embodiment of the present invention.

At step 306, an inner upper boundary of the left diaphragm region is detected. The upper boundary of the left diaphragm is detected in two parts, the inner upper boundary and the outer upper boundary extending from the inner and outer corners, respectively. FIG. 5 illustrates a method for detecting the inner upper boundary of the left diaphragm region according to an embodiment of the present invention. Detection of the inner upper boundary is similar to the detection of the inner vertical boundary. As illustrated in FIG. 5, at step 502, horizontal edge enhancement is applied inside the ROI (i.e., inside the heart region). At step 504, the edge enhanced image is binarized and thinned. The binarization operation used to binarize the edge enhanced image can use a higher threshold (e.g., threshold—110, for normalized edge enhanced image) relative to the edge enhancement of the method of FIG. 4. A high binarization threshold helps to reduce the number of detected horizontal components. At step 506, connected components in a horizontal direction with size greater than a threshold value are detected. For example, the threshold value may be 30 pixels. At step 508, it is determined whether there are more than one connected components larger than the threshold value detected. If there is not more than one connected component detected, the method proceeds to step 516, with the one connected component as the optimal component. If there are more than one connected component detected the method proceeds the step 510. At step 510, a connected component closest to a reference point is selected as the optimal component. The calculation of closeness to the reference point weighs the flowing factors: the average distance of the connected component to the reference point, the size of the component, and the orientation of the line (a horizontal line is preferred). At step 512, all connected components other than the optimal component are removed, and the edge enhanced image is binarized and thinned again using a lower binarization threshold (e.g., 80). At step 514, the optimal component is recalculated including the originally selected optimal component in order to validate the optimal component. This is to ensure that a complete inner boundary portion is obtained even with a less prominent faint boundary. At step 516, the inner upper boundary of the left diaphragm is detected by fitting the optimal component with a curve.

Returning to FIG. 3, at step 308, the outer upper boundary of the left diaphragm is detected. The outer upper boundary of the left diaphragm region is coincident with the lower boundary of the left lung lobe. The inner upper boundary and the outer upper boundary of the left diaphragm region connect together to form the upper boundary of the left diaphragm region.

At step 310, a lower boundary of the left diaphragm region is determined based on the inner and outer corners of the left diaphragm region. Similar to the lower boundary of the right diaphragm region, it may be difficult to extract the lower boundary of the left diaphragm region directly from the chest X-ray image. Accordingly, the lower boundary of the left diaphragm region is estimated heuristically based on the upper boundary of the left diaphragm region. The lower boundary of the left diaphragm region can be determined by estimating an ellipsoid shape passing through the inner corner and the outer corner. The bottom portion of the ellipsoid shape is used as the lower boundary of the left diaphragm region.

At step 312, points on the lower boundary of the left diaphragm region are adjusted based on local edge information. Step 312 is an optional step that provides small adjustments to the left diaphragm region lower boundary based on local edge information in order take into account any edge information that is available in the chest X-ray image. For example, the position of a given boundary point on the lower boundary of the left diaphragm region can be adjusted up 2-3 pixels up or down to the peak position of a local edge.

Once the right and left diaphragm regions are segmented, as described above, the segmenting boundaries of the right and left diaphragms are output. For example, the right and left diaphragm region boundaries can be displayed as an image on a display of a computer system, or stored in a memory or storage of a computer system, or computer readable medium. The segmented diaphragm regions can be used in other image processing methods implemented on the computer system. For example, the diaphragm regions can be used in nodule detection methods in order to separately detect nodules in the segmented diaphragm regions.

Figure 6:
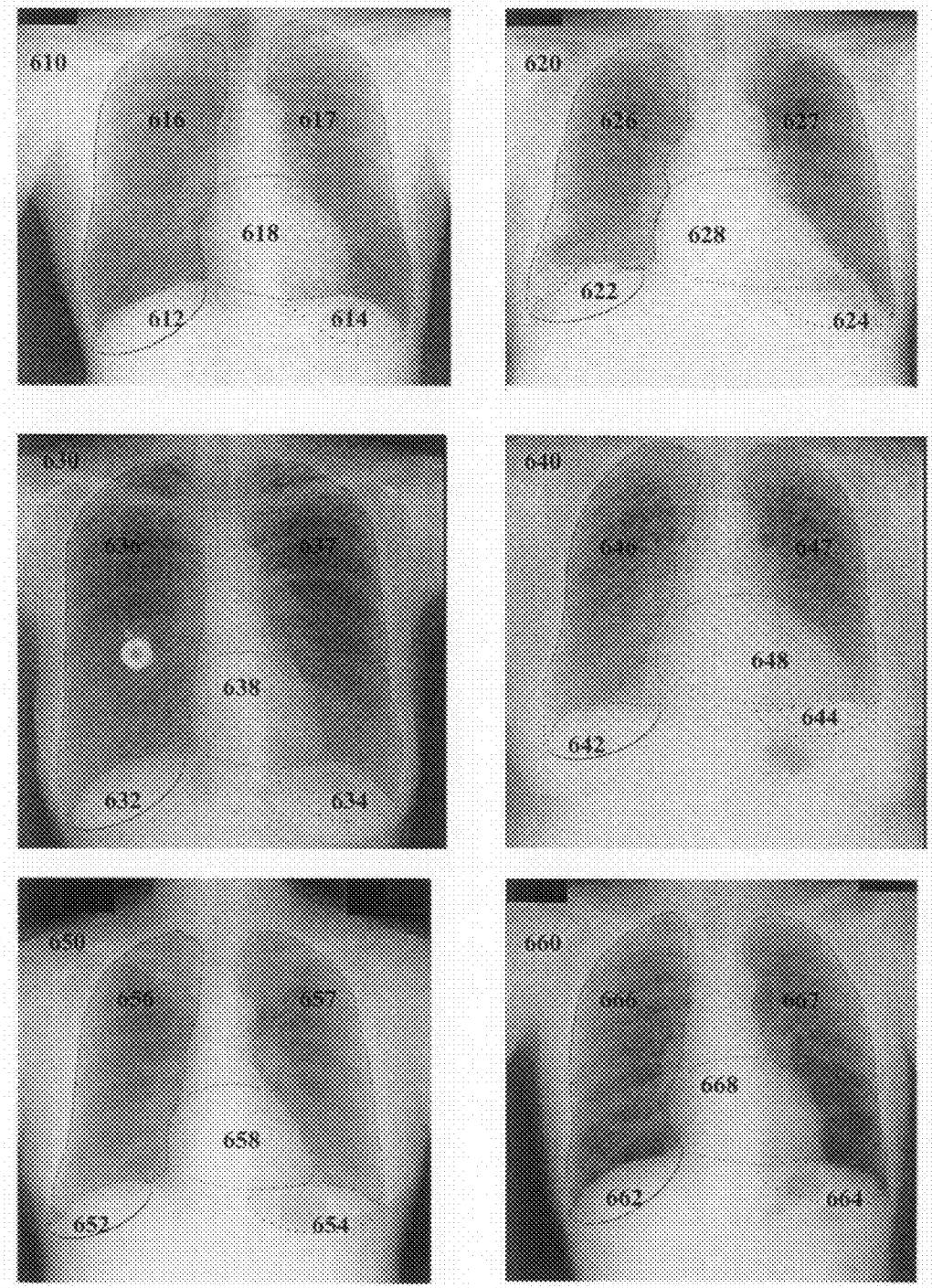
FIG. 6 illustrates exemplary diaphragm segmentation results using the methods of FIGS. 1-5.

FIG. 6 illustrates exemplary diaphragm segmentation results using the methods of FIGS. 1-5. As illustrated in FIG. 6, images 610, 620, 630, 640, 650, and 660 are chest x-ray images showing right diaphragm regions 612, 622, 632, 642, 652, and 662 and left diaphragm regions 614, 624, 634, 644, 654, and 664 segmented as described above. Images 610, 620, 630, 640, 650, and 660 also show right lung lobe regions 616, 626, 636, 646, 656, and 666, left lung lobe regions 617, 627, 637, 647, 657, and 667, and heart regions 618, 628, 638, 648, 658, and 668 used to segment the right diaphragm regions 612, 622, 632, 642, 652, and 662 and left diaphragm regions 614, 624, 634, 644, 654, and 664, respectively.

Figure 7:
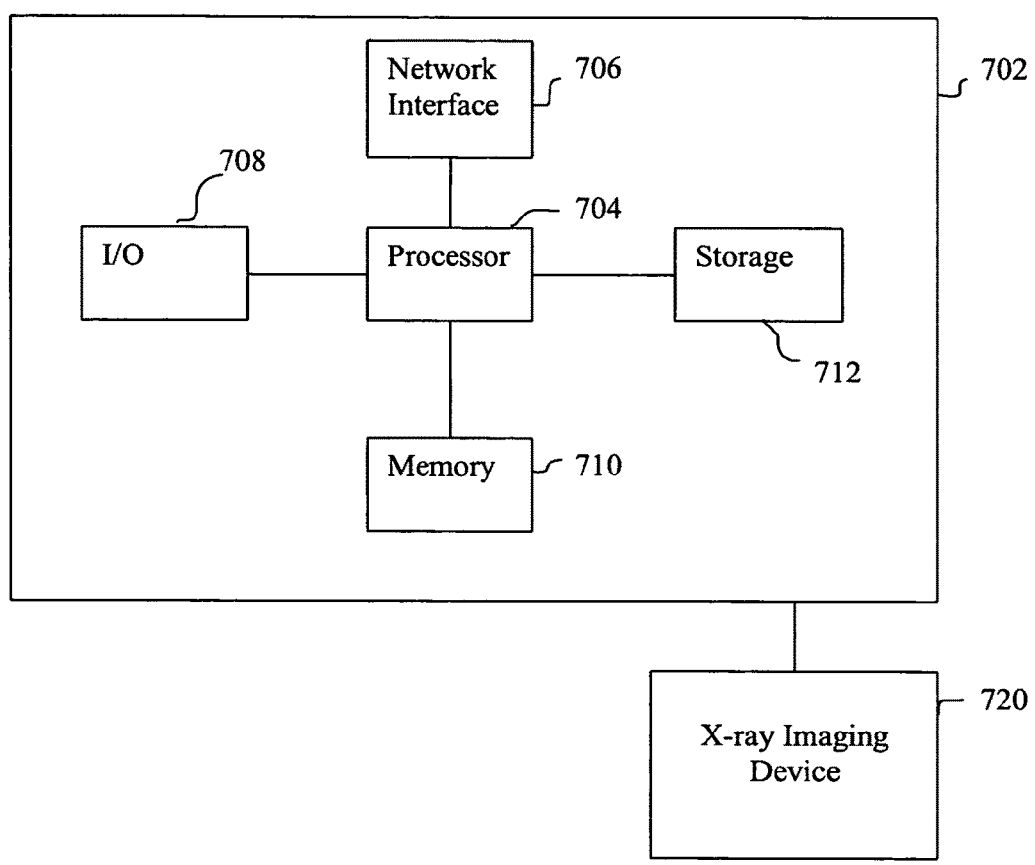
FIG. 7 is a high level block diagram of a computer capable of implementing the present invention.

The above-described method for segmenting diaphragm regions in a chest X-ray radiograph (image) may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the method steps of FIGS. 1-5 can be defined by the computer program instructions stored in the memory 710 and/or storage 712 and controlled by the processor 704 executing the computer program instructions. For example, the computer program instructions can be implemented as computer executable code programmed by one skilled in the art to perform an algorithm defined by the method steps of FIGS. 1-5. Accordingly, by executing the computer program instructions, the processor 704 executes an algorithm defined by the method steps of FIGS. 1-5. An X-ray imaging device 720 can be connected to the computer 702 to input X-ray radiographs to the computer 702. It is possible to implement the X-ray imaging device 720 and the computer 702 as one device. It is also possible that the X-ray imaging device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting diaphragm regions in a chest X-ray radiograph, comprising:
    segmenting a right diaphragm region based on a boundary of a right lung lobe region in the chest X-ray radiograph; and
    segmenting a left diaphragm region based on a heart region and a boundary of a left lung lobe region in the chest X-ray radiograph.

2. The method of claim 1, wherein said step of segmenting a right diaphragm region comprises:
    detecting an upper boundary of the right diaphragm region coincident with a lower boundary of the right lung lobe region; and
    determining a lower boundary of the right diaphragm region as a symmetric reflection of the upper boundary of the right diaphragm region.

3. The method of claim 2, wherein said step of segmenting a right diaphragm region further comprises:
    adjusting points on the lower boundary of the right diaphragm region based on local edge information.

4. The method of claim 1, wherein said step of segmenting a left diaphragm region comprises:
    detecting an inner corner of the left diaphragm region;
    detecting an outer corner of the left diaphragm region;
    detecting an inner upper boundary of the left diaphragm region extending from the inner corner of the left diaphragm region;
    detecting an outer upper boundary of the left diaphragm region extending from the outer corner of the left diaphragm region and connecting with the inner upper boundary of the left diaphragm region to form an upper boundary of the left diaphragm region; and
    determining a lower boundary of the left diaphragm region based on the inner and outer corners of the left diaphragm region.

5. The method of claim 4, wherein said step of detecting an inner corner of the left diaphragm region comprises:
    applying vertical edge enhancement inside a region of interest defined by the heart region resulting in an edge enhanced image;
    binarizing and thinning the edge enhance image;
    detecting connect components within the region of interest;
    determining whether a largest one the connected components is longer than a threshold value;
    if the largest one of the connected components is not longer than the threshold value, using a default point on a boundary of the heart region as the inner corner of the left diaphragm; and
    if the largest one of the connected components is longer than the threshold value,
        selecting an optimal connect component,
        determining an inner vertical boundary by fitting a curve to the selected optimal connected component, and
        detecting the inner corner as an intersection of the inner vertical boundary and a lower boundary of the heart region.

6. The method of claim 4, wherein said step of detecting an outer corner of the left diaphragm region further comprises:
    detecting an outer vertical boundary in a region of interest defined as a lower portion of the left lung lobe region below an upper boundary of the heart region; and
    detecting an intersection between the outer vertical boundary and a lower boundary of the left lung lobe region.

7. The method of claim 4, wherein said step of detecting an inner upper boundary of the left diaphragm region comprises:
    applying horizontal edge enhancement inside a region of interest defined by the heart region resulting in an edge enhanced image;
    binarizing and thinning the edge enhanced image at a first binarization threshold;
    detecting connected components larger than a threshold value in the region of interest;
    selecting an optimal connected component;
    removing connected components other than the optimal connected component and re-binarizing and thinning the edge enhanced image at a second binarization threshold;
    re-calculating the optimal connected component;
    detecting the inner upper boundary of the left diaphragm region by fitting a curve to the optimal connected component.

8. The method of claim 4, wherein said step of detecting an outer upper boundary of the left diaphragm region comprises:
    detecting an outer upper boundary of the left diaphragm region coincident with a lower boundary of the left lung lobe.

9. The method of claim 4, wherein said step of determining a lower boundary of the left diaphragm region based on the inner and outer corners of the left diaphragm region comprises:
    estimating an ellipsoid shape that passes through the inner and outer corners of the left diaphragm region.

10. The method of claim 4, wherein said step of segmenting a left diaphragm region further comprises:
    adjusting points on the lower boundary of the left diaphragm region based on local edge information.

11. An apparatus for segmenting diaphragm regions in a chest X-ray radiograph, comprising:
    means for segmenting a right diaphragm region based on a boundary of a right lung lobe region in the chest X-ray radiograph; and
    means for segmenting a left diaphragm region based on a heart region and a boundary of a left lung lobe region in the chest X-ray radiograph.

12. The apparatus of claim 11, wherein said means for segmenting a right diaphragm region comprises:
    means for detecting an upper boundary of the right diaphragm region coincident with a lower boundary of the right lung lobe region; and
    means for determining a lower boundary of the right diaphragm region as a symmetric reflection of the upper boundary of the right diaphragm region.

13. The apparatus of claim 1, wherein said means for segmenting a left diaphragm region comprises:
    means for detecting an inner corner of the left diaphragm region;
    means for detecting an outer corner of the left diaphragm region;
    means for detecting an inner upper boundary of the left diaphragm region extending from the inner corner of the left diaphragm region;
    means for detecting an outer upper boundary of the left diaphragm region extending from the outer corner of the left diaphragm region and connecting with the inner upper boundary of the left diaphragm region to form an upper boundary of the left diaphragm region; and means for determining a lower boundary of the left diaphragm region based on the inner and outer corners of the left diaphragm region.

14. The apparatus of claim 13, wherein said means for detecting an inner corner of the left diaphragm region comprises:

means for applying vertical edge enhancement inside a region of interest defined by the heart region resulting in an edge enhanced image;

means for binarizing and thinning the edge enhance image;

means for detecting connect components within the region of interest;

means for selecting an optimal connect component;

means for determining an inner vertical boundary by fitting a curve to the selected optimal connected component; and means for detecting the inner corner as an intersection of the inner vertical boundary and a lower boundary of the heart region.

15. The apparatus of claim 13, wherein said means for detecting an outer corner of the left diaphragm region further comprises:

means for detecting an outer vertical boundary in a region of interest defined as a lower portion of the left lung lobe region below an upper boundary of the heart region; and means for detecting an intersection between the outer vertical boundary and a lower boundary of the left lung lobe region.

16. The apparatus of claim 13, wherein said means for detecting an inner upper boundary of the left diaphragm region comprises:

means for applying horizontal edge enhancement inside a region of interest defined by the heart region resulting in an edge enhanced image;

means for binarizing and thinning the edge enhanced image;

means for detecting connected components larger than a threshold value in the region of interest;

means for selecting an optimal connected component; and means for detecting the inner upper boundary of the left diaphragm region by fitting a curve to the optimal connected component.

17. The apparatus of claim 13, wherein said means for detecting an outer upper boundary of the left diaphragm region comprises:

means for detecting an outer upper boundary of the left diaphragm region coincident with a lower boundary of the left lung lobe.

18. The method of claim 4, wherein said means for determining a lower boundary of the left diaphragm region based on the inner and outer corners of the left diaphragm region comprises:

means for estimating an ellipsoid shape that passes through the inner and outer corners of the left diaphragm region.

19. A computer readable medium encoded with computer executable instructions for segmenting diaphragm regions in a chest X-ray radiograph, the computer executable instructions defining steps comprising:

segmenting a right diaphragm region based on a boundary of a right lung lobe region in the chest X-ray radiograph; and segmenting a left diaphragm region based on a heart region and a boundary of a left lung lobe region in the chest X-ray radiograph.

20. The computer readable medium of claim 19, wherein the computer executable instructions defining the step of segmenting a right diaphragm region comprise computer executable instructions defining the steps of:

detecting an upper boundary of the right diaphragm region coincident with a lower boundary of the right lung lobe region; and determining a lower boundary of the right diaphragm region as a symmetric reflection of the upper boundary of the right diaphragm region.

21. The computer readable medium of claim 19, wherein the computer executable instructions defining the step of segmenting a left diaphragm region comprise computer executable instructions defining the steps of:

detecting an inner corner of the left diaphragm region;

detecting an outer corner of the left diaphragm region;

detecting an inner upper boundary of the left diaphragm region extending from the inner corner of the left diaphragm region;

detecting an outer upper boundary of the left diaphragm region extending from the outer corner of the left diaphragm region and connecting with the inner upper boundary of the left diaphragm region to form an upper boundary of the left diaphragm region; and determining a lower boundary of the left diaphragm region based on the inner and outer corners of the left diaphragm region.

22. The computer readable medium of claim 21, wherein the computer executable instructions defining the step of detecting an inner corner of the left diaphragm region comprise computer executable instructions defining the steps of:

applying vertical edge enhancement inside a region of interest defined by the heart region resulting in an edge enhanced image;

binarizing and thinning the edge enhance image;

detecting connect components within the region of interest;

determining whether a largest one the connected components is longer than a threshold value;

if the largest one of the connected components is not longer than the threshold value, using a default point on a boundary of the heart region as the inner corner of the left diaphragm; and if the largest one of the connected components is longer than the threshold value,
  selecting an optimal connect component,
  determining an inner vertical boundary by fitting a curve to the selected optimal connected component, and
  detecting the inner corner as an intersection of the inner vertical boundary and a lower boundary of the heart region.

23. The computer readable medium of claim 21, wherein the computer executable instructions defining the step of detecting an outer corner of the left diaphragm region further comprise computer executable instructions defining the steps of:

detecting an outer vertical boundary in a region of interest defined as a lower portion of the left lung lobe region below an upper boundary of the heart region; and detecting an intersection between the outer vertical boundary and a lower boundary of the left lung lobe region.

24. The computer readable medium of claim 21, wherein the computer executable instructions defining the step of detecting an inner upper boundary of the left diaphragm region comprise computer executable instructions defining the steps of:

applying horizontal edge enhancement inside a region of interest defined by the heart region resulting in an edge enhanced image;

binarizing and thinning the edge enhanced image at a first binarization threshold;

detecting connected components larger than a threshold value in the region of interest;

selecting an optimal connected component;

removing connected components other than the optimal connected component and re-binarizing and thinning the edge enhanced image at a second binarization threshold;

re-calculating the optimal connected component; and detecting the inner upper boundary of the left diaphragm region by fitting a curve to the optimal connected component.

25. The computer readable medium of claim 21, wherein the computer executable instructions defining the step of detecting an outer upper boundary of the left diaphragm region comprise computer executable instructions defining the step of:

detecting an outer upper boundary of the left diaphragm region coincident with a lower boundary of the left lung lobe.

26. The computer readable medium of claim 21, wherein the computer executable instructions defining the step of determining a lower boundary of the left diaphragm region based on the inner and outer corners of the left diaphragm region comprise computer executable instructions defining the step of:

estimating an ellipsoid shape that passes through the inner and outer corners of the left diaphragm region.

* * * * *